United States Patent
Sugiura

(10) Patent No.: US 9,246,631 B2
(45) Date of Patent: Jan. 26, 2016

(54) COMMUNICATION DEVICES THAT ENCODE AND TRANSMIT DATA, METHODS OF CONTROLLING SUCH COMMUNICATION DEVICES, AND COMPUTER-READABLE STORAGE MEDIA STORING INSTRUCTIONS FOR CONTROLLING SUCH COMMUNICATION DEVICES

(75) Inventor: Masatoshi Sugiura, Kariya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 720 days.

(21) Appl. No.: 13/569,859

(22) Filed: Aug. 8, 2012

(65) Prior Publication Data

US 2013/0051568 A1    Feb. 28, 2013

(30) Foreign Application Priority Data

Aug. 31, 2011    (JP) .................................. 2011-188793

(51) Int. Cl.
| | |
|---|---|
| H04R 29/00 | (2006.01) |
| H04L 1/00 | (2006.01) |
| H04L 29/06 | (2006.01) |
| H04L 12/811 | (2013.01) |
| H04L 12/853 | (2013.01) |
| H04L 1/18 | (2006.01) |

(52) U.S. Cl.
CPC ............ *H04L 1/0041* (2013.01); *H04L 1/1896* (2013.01); *H04L 65/602* (2013.01); (Continued)

(58) Field of Classification Search
CPC ..... H04L 65/80; H04L 1/0041; H04L 1/1812; H04L 1/1896; H04L 47/2416; H04L 47/38; H04L 65/602; H04L 65/607
USPC .......................................................... 381/56
See application file for complete search history.

(56) References Cited

U.S. PATENT DOCUMENTS

| | | |
|---|---|---|
| 5,721,742 A | 2/1998 | Okajima et al. |
| 2005/0289615 A1 | 12/2005 | Nishitani |

(Continued)

FOREIGN PATENT DOCUMENTS

| | | |
|---|---|---|
| JP | H07-336364 A | 12/1995 |
| JP | H09-046766 A | 2/1997 |

(Continued)

OTHER PUBLICATIONS

Japan Patent Office, Notice of Reasons for Rejection for Japanese Patent Application No. 2011-188793 (counterpart to above-captioned patent application), mailed May 20, 2014.

(Continued)

*Primary Examiner* — Paul S Kim
(74) *Attorney, Agent, or Firm* — Baker Botts L.L.P.

(57) ABSTRACT

A communication device includes a processor and a memory. The memory stores computer-readable instructions therein. The computer-readable instructions instruct the processor to acquire media data comprising one or more of image data and audio data from an acquiring device. The computer-readable instructions instruct the processor to encode the acquired media data to generate particular encoded data. The computer-readable instructions instruct the processor to determine whether a data size of the particular encoded data is equal to or greater than a threshold data size. The computer-readable instructions instruct the processor to encode the particular encoded data using redundancy processing to generate redundantly-encoded data when determining that the data size of the particular encoded data is equal to or greater than the threshold data size. The computer-readable instructions instruct the processor to transmit the redundantly-encoded data as one or more packets to another communication device.

10 Claims, 11 Drawing Sheets

(52) U.S. Cl.
CPC .............. *H04L65/607* (2013.01); *H04L 65/80* (2013.01); *H04L 1/1812* (2013.01); *H04L 47/2416* (2013.01); *H04L 47/38* (2013.01)

(56) References Cited

U.S. PATENT DOCUMENTS

| | | | |
|---|---|---|---|
| 2007/0079222 A1 | 4/2007 | Kure et al. | |
| 2011/0231727 A1* | 9/2011 | Kure | H04L 1/1877 714/751 |

FOREIGN PATENT DOCUMENTS

| | | |
|---|---|---|
| JP | 2002-208930 A | 7/2002 |
| JP | 2006-042306 A | 2/2006 |
| JP | 2007-134836 A | 5/2007 |

OTHER PUBLICATIONS

Japan Patent Office; Decision of Final Rejection issued for Japanese Patent Application No. 2011-188793 (foreign counterpart to above-captioned patent application), mailed Oct. 28, 2014.

* cited by examiner

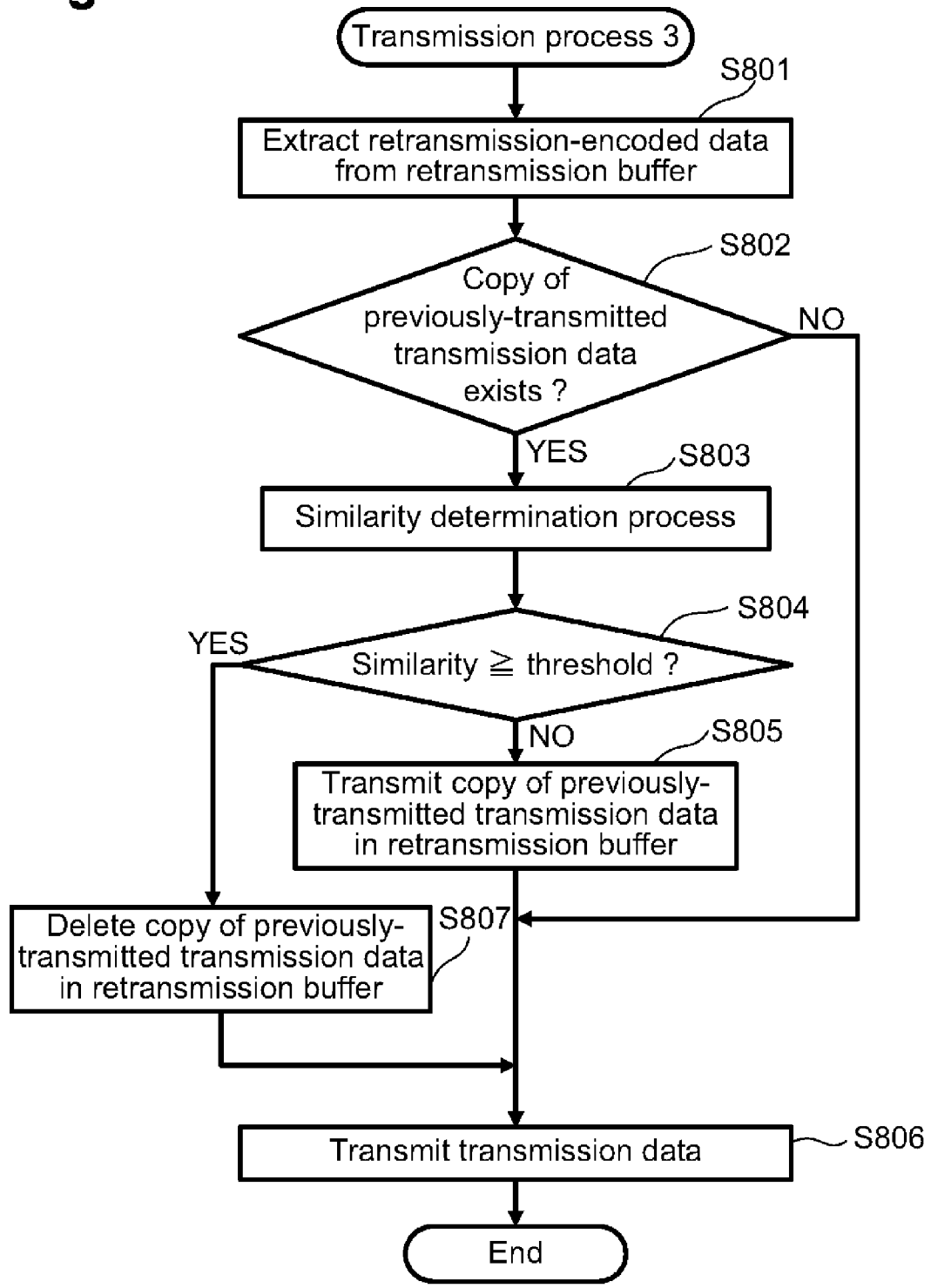

COMMUNICATION DEVICES THAT ENCODE AND TRANSMIT DATA, METHODS OF CONTROLLING SUCH COMMUNICATION DEVICES, AND COMPUTER-READABLE STORAGE MEDIA STORING INSTRUCTIONS FOR CONTROLLING SUCH COMMUNICATION DEVICES

CROSS-REFERENCE TO RELATED APPLICATION

This application claims priority from Japanese Patent Application No. 2011-188793, filed on Aug. 31, 2011, the disclosure of which is incorporated herein by reference.

BACKGROUND OF THE INVENTION

1. Field of the Invention

The present disclosure relates generally to communication systems, and more specifically to communication devices that encode and transmit data, methods of controlling such communication devices, and computer-readable storage media storing instructions for controlling such communication devices.

2. Description of Related Art

Methods and systems for transferring multimedia data via a communication network are known. The multimedia data includes image data captured with, for example, camera equipment, audio data, such as sound collected through microphone equipment, or a combination of image data and audio data. Methods of transmitting multimedia data include downloading and streaming. In a known downloading transmission system, presentation of content included in the multimedia data begins after the multimedia data is transferred to a receiving device.

SUMMARY OF THE INVENTION

According to embodiments, a communication device disclosed herein may comprise a processor and a memory. The memory may be configured to store computer-readable instructions therein. The computer-readable instructions may instruct the processor to execute certain processes. The computer-readable instructions may instruct the processor to execute a process of acquiring media data comprising one or more of image data and audio data from an acquiring device. The computer-readable instructions may instruct the processor to execute a process of encoding the acquired media data to generate particular encoded data. The computer-readable instructions may instruct the processor to execute a process of determining whether a data size of the particular encoded data is equal to or greater than a threshold data size. The computer-readable instructions may instruct the processor to execute a process of encoding the particular encoded data using redundancy processing to generate redundantly-encoded data when determining that the data size of the particular encoded data is equal to or greater than the threshold data size. The computer-readable instructions may instruct the processor to execute a process of transmitting the redundantly-encoded data as one or more packets to another communication device.

According to other embodiments, a method for controlling a communication device disclosed herein may comprise certain processes for controlling the communication device. The method may comprise a process of acquiring media data comprising one or more of image data and audio data from an acquiring device. The method may comprise a process of generating particular encoded data from the acquired media data. The method may comprise a process of determining whether a data size of the particular encoded data is equal to or greater than a threshold data size. The method may comprise a process of generating redundantly-encoded data from the particular encoded data using redundancy processing when it is determined that the data size of the particular encoded data is equal to or greater than the threshold data size. The method may comprise a process of transmitting the redundantly-encoded data as a packet to another communication device.

According to yet other embodiments, a non-transitory, computer-readable storage medium disclosed herein may store computer-readable instructions therein. The computer-readable instructions may instruct a communication device to execute certain processes. According to yet other embodiments, a non-transitory, computer-readable storage medium disclosed herein may store computer-readable instructions therein. The computer-readable instructions may instruct the communication device to execute a process of acquiring media data comprising one or more of image data and audio data from an acquiring device. The computer-readable instructions may instruct the communication device to execute a process of encoding the acquired media data to generate particular encoded data. The computer-readable instructions may instruct the communication device to execute a process of determining whether a data size of the particular encoded data is equal to or greater than a threshold data size. The computer-readable instructions may instruct the communication device to execute a process of encoding the particular encoded data using redundancy processing to generate redundantly-encoded data when determining that the data size of the particular encoded data is equal to or greater than the threshold data size. The computer-readable instructions may instruct the communication device to execute a process of transmitting the redundantly-encoded data as a packet to another communication device.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present disclosure, needs satisfied thereby, and the objects features, and advantages thereof, reference now is made to the following descriptions taken in connection with the accompanying drawings.

FIG. 11 depicts still another transmission process according to still other embodiments.

DETAILED DESCRIPTION OF EMBODIMENTS OF THE INVENTION

In a streaming transmission system, reproduction may be started using a portion of data transmitted from a transmitting device to a receiving device. The streaming transmission system may be utilized in, for example, Internet telephone systems, television ("TV") conference systems, and network camera systems. An example streaming transmission system may be a Real-time Transport Protocol ("RTP") system specified by IETF RFC3550. In the RTP system, a temporal relationship among packet transmission data may be recognized at the receiving device when time information is added to the packet transmission data. This may permit reproduction without being affected by, for example, delay fluctuations during packet transmission.

In the RTP system described above, however, transmission delay may occur at the transmitting device, and packet loss may occur along a transmission path. Consequently, Auto Repeat Request ("ARQ"), Forward Error Correction ("FEC"), and other systems may be used to increase reliability of data transmission using the RTP system. ARQ is an automatic retransmission system. FEC is a forward error correction system. In the ARQ system, a sequence number of a lost packet may be detected and the receiving device may request the transmitting device to retransmit the lost packet. In the FEC system, redundancy processing may be used to redundantly encode data utilizing, for example, Reed-Solomon Codes or other error-correcting codes using plural packets as a single FEC block. In certain systems, a packet loss rate along the transmission path may be detected during the transmission using the FEC system, and a suitable level of redundancy may be determined in accordance with the detected loss rate. Accordingly, a transmitting device may be utilized that provides the suitable level of redundancy, which may, for example, reduce network confusion caused by an unnecessary level of redundancy.

When the transmitting device is used in, for example, TV conference equipment, the FEC process may be carried out such that transmission data is divided into a plurality of packets. The transmission data thus may become redundant (e.g., redundantly-encoded data). Consequently, a network communication band may be used inefficiently when relatively small pieces media transmission data are made redundant. Relatively small multimedia data comprises, for example, audio data and image data that may be associated with a capturing target that may move a small amount, such that the captured multimedia data is similar.

Figure 1:
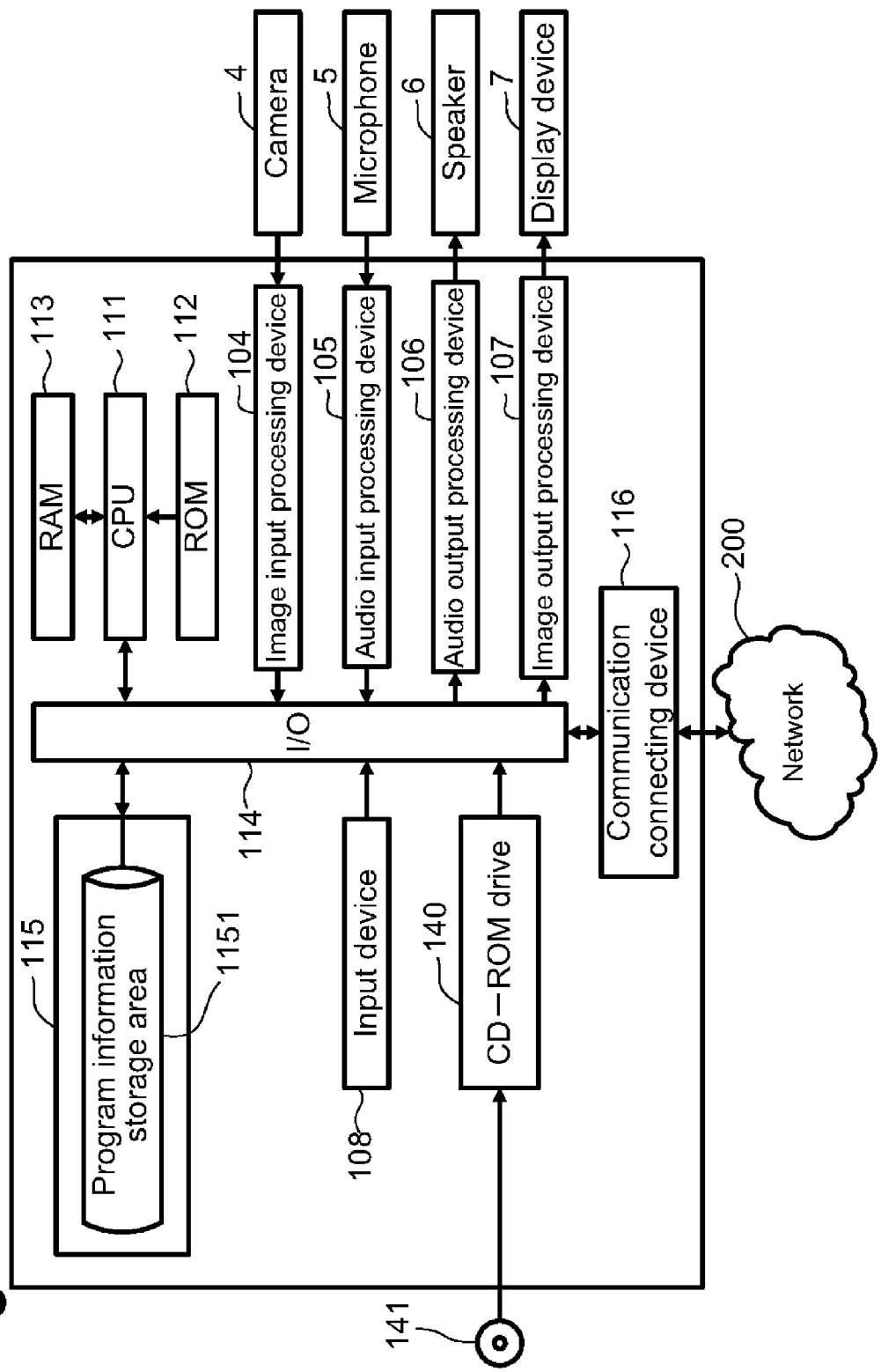
FIG. 1 is a diagram depicting an electrical configuration of a communication device 1 according to embodiments.

Hereinafter, exemplary embodiments now are described with reference to the drawings. With reference to FIG. 1, an electrical configuration of a communication device 1 now is described. For example, an existing personal computer, and a dedicated terminal for TV conferencing may be used as the communication device 1. The communication device 1 may communicate multimedia data with another communication device (e.g., another communication device 1) via a network 200 (e.g., the Internet or a local area network). The multimedia data may comprise, for example, audio data, image data, or both. The network 200 may comprise, for example, an Integrated Services Digital Network ("ISDN").

As depicted in FIG. 1, the communication device 1 may comprise a central processing unit ("CPU") 111, a read-only memory ("ROM") 112, and a random-access memory ("RAM") 113. ROM 112 and RAM 113 may be connected individually to the CPU 111 (e.g., a processor or controller), which may be configured to control of the communication device 1.

An input/output ("I/O") interface 114 may be electrically connected to the CPU 111. An image input processing device 104, an audio input processing device 105, an audio output processing device 106, an image output processing device 107, a storage device 115, a communication connecting device 116, an input device 108, and a compact-disc read-only memory ("CD-ROM") drive 140 may be electrically connected to the I/O interface 114. Alternatively to or additionally to CD-ROM drive 140, other devices known for reading non-transitory computer-readable media may be used.

The CPU 111 may manage control of the entire communication device 1. Various programs, comprising the basic input-output system ("BIOS"), that operate the communication device 1 and various set points for such operations may be stored in the ROM 112. The CPU 111 may control the operation of the communication device 1 in accordance with the programs stored in the ROM 112 and in the storage device 115, which is described below. The RAM 113 may be a storage device for temporarily storing various data. A camera 4 may be electrically connected to the image input processing device 104. A microphone 5 may be electrically connected to the audio input processing device 105. A speaker 6 may be electrically connected to the audio output processing device 106. A display device 7 may be electrically connected to the image output processing device 107. The camera 4 may comprise image capturing equipment that may capture an image in the vicinity of the communication device 1. The camera 4 may be, for example, general-purpose digital camera equipment. The image input processing device 104 may process input image data from the camera 4. The microphone 5 may acquire audio in the vicinity of the communication device 1. The audio input processing device 105 may process audio data input from the microphone 5. The speaker 6 may output audio data transmitted from other equipment. The speaker may be in a location different from a location of the other equipment. The audio output processing device 106 may process audio data output to the speaker 6. The image output processing device 107 may process output of, for example, an image signal to the display device 7. The display device 7 may be, for example, a general-purpose liquid crystal display or an organic electroluminescence display. Further, various combinations of camera 4, microphone 5, speaker 6, and display device 7 may be incorporated into a single device.

The storage device 115 may be provided with plural storage areas comprising a program information storage area 1151. Although not depicted in detail, various programs for carrying out data-transmitting functions and data-receiving functions (e.g., transmitting and receiving audio data and image data between other devices) may be stored in the program information storage area 1151. The communication connecting device 116 may be connected to the network 200 and may communicate various data with other communication devices 1. The various data may be, for example, image data, audio data, or both. The input device 108 may be used to input each operation instruction in the communication device 1. The input device 108 may be, for example, one or more of a keyboard, a mouse, and touch panel equipment. The CD-ROM drive 140 may read program data recorded on a CD-ROM 141 or another non-transitory computer-readable storage medium appropriate for use with drive 140. Program data for carrying out each function of the communication device 1 may be stored in the CD-ROM 141. When the CD-ROM 141 is introduced, the various program data on the CD-ROM 141 may be stored in the program information storage area 1151. The programs to be stored in the program information storage area 1151 may be downloaded from an external server via the network 200.

Figure 2:
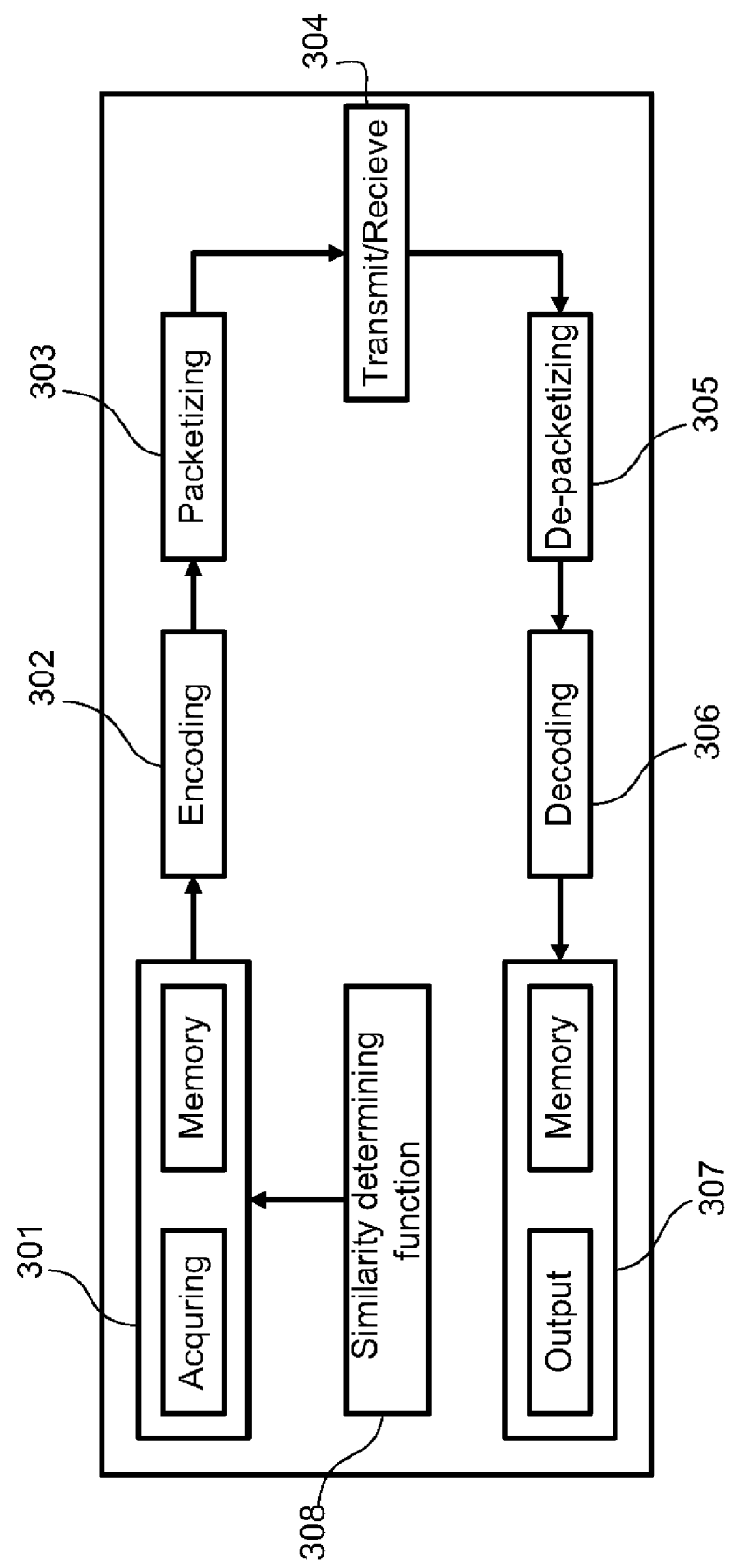
FIG. 2 is a diagram of functional blocks depicting processes of a CPU 111.

Functions carried out by the communication device 1 of FIG. 1 and data flows now are described with reference to FIG. 2. Various functions depicted in FIG. 2 may be carried out in the CPU 111 of the communication device 1. The communication device 1 may have an acquiring function 301, an encoding function 302, a packetizing function 303, a transmitting/receiving function 304, a de-packetizing function 305, a decoding function 306, an output function 307, and a similarity determining function 308. Each function is described below.

While performing the acquiring function 301, the CPU 111 may acquire original data for a packet that is to be transmitted to another communication device (e.g., another communication device 1). The original data may comprise various multimedia data, such as, for example, audio data, image data, or both. The audio data may be acquired from the microphone 5 via the audio input processing device 105. The image data may be captured by the camera 4 and acquired via the image input processing device 104. The acquired original data may be temporarily stored in the RAM 113.

While performing the encoding function 302, the CPU 111 may encode the original data stored in the RAM 113. A suitable encoding system may be selected in accordance with attributes of the original data (e.g., type of data structure, header information, type of data, size of data), and encoding may be carried out using the suitable encoding system. Encoding may be carried out at a predetermined frequency. The FEC process according to exemplary embodiments also may be performed as part of the encoding function 302. When the FEC process is carried out, redundancy data may be generated for the original data, such that a plurality of packets may be generated, each packet of a predetermined transmission size (e.g., 1000 to 1500 kb). The redundancy data may provide redundancy for the original data. When the plurality of FEC-processed packets are received by the other communication device 1 (e.g., a receiving device), the receiving device may carry out a decoding process for the data from the plurality of received packets utilizing the redundancy data. Therefore, even when the original data is partially lost due to, for example, packet loss, the original data may be decoded with complementary redundancy data, and a reproduction process may be carried out in accordance with the original data.

While performing the packetizing function 303, the CPU 111 may generate a packet comprising encoded data. The CPU 111 may add destination address information corresponding to a transmission destination device and identification information of the communication device 1 itself to the data encoded via the encoding function 302. Further, header information comprising, for example, attribute information regarding the encoded data may be added to the encoded data. Thus, a packet may be created. Details of this process are described below. As part of the transmitting/receiving function 304, the CPU 111 may transmit the packet created via the packetizing function 303 to another communication device 1 via the communication connecting device 116. As part of the transmitting/receiving function 304, the CPU 111 also may receive a packet transmitted from another communication device via the communication connecting device 116.

While performing the de-packetizing function 305, the CPU 111 may remove a header section from the packet received via the transmitting/receiving function 304, and the CPU 111 may extract the encoded data from the packet. As part of the decoding function 306, the CPU 111 may decode the encoded data extracted via the de-packetizing function 305 in accordance with the header information. The decoded data may be stored temporarily in the RAM 113. As part of the output function 307, the CPU 111 may output the decoded data stored in the RAM 113 regarding each attribute of the original data. For example, the audio data may be output from the speaker 6 via the audio output processing device 106. The image data may be output to and displayed on the display device 7 via the image output processing device 107.

While performing the similarity determining function 308, the CPU 111 may determine similarities between the previously-transmitted and subsequent data in the order of acquisition and the original data (e.g., various multimedia data) acquired as part of the acquiring function 301. A similarity determination process now is described. For example, when the original data acquired via the acquiring function 301 is audio data, frequency analysis may be carried out on the audio data to extract audio waveforms. It may be determined whether the similarity in the audio waveform extracted from the previously-transmitted and subsequent audio data may be equal to or greater than a predetermined threshold similarity. A suitable threshold similarity may be, for example, about 80% similarity. Similarity in audio waveform may be measured by an existing method. For example, similarity may be calculated through, for example, pattern matching using the shape of the extracted audio waveform. Nevertheless, the above-described methods for calculating a similarity of audio data are not restrictive, and similarity may be calculated using a plurality of other known methods.

When the original data acquired via the acquiring function 301 is image data, the CPU 111 may perform the similarity determining function 308 and extract two-dimensional outline shapes from the image data. The CPU 111 subsequently may calculate similarity regarding the extracted outline shape by an existing method, such as, for example, pattern matching. Similarity in the image data may be calculated by methods other than pattern matching, such as, for example, by calculating similarity regarding color distribution of the image data. Nevertheless, the above-described methods for calculating a similarity of image data are not restrictive, and similarity may be calculated using a plurality of other known methods.

A transmission-side main process, which may be carried out by the CPU 111 of the communication device 1, now is described with reference to FIG. 3. The process depicted in FIG. 3 may be started when the communication device 1 is turned on, and may be implemented periodically at predetermined time intervals. Various processes are described below under an assumption that the communication device 1 of FIG. 1 is in a communication connecting state in which the communication device 1 is configured to transmit and receive multimedia data, such as, for example, audio data, image data, or both, to and from another communication device via the network 200.

The CPU 111 may carry out a multimedia data acquiring process (S401). At S401, the CPU 111 may acquire multimedia data, such as image data, audio data, or both, input from one or more of the camera 4 and the microphone 5. Subsequently, the CPU 111 may carry out a normal encoding process on the multimedia data acquired at S401 (S402). At S402, normally-encoded data, which is multimedia data acquired at S401 that has been encoded without the FEC process, may be created. The CPU 111 may determine the size of the normally-encoded data created at S402 (S403). At S403, the size of the normally-encoded data may be converted into a value having standard units, such as, for example, Kb.

Subsequently, the CPU 111 may determine whether the size of the data acquired at S403 is greater than a threshold data size (S404). In the communication device 1 of FIG. 1, assuming that the maximum data size that may be transmitted in the communication path is set, for example, to 1500 Kb, the threshold data size may be determined to be one half of 1500 Kb or less (e.g., about 700 Kb). The above-described threshold data size is not a restrictive example, and the threshold value may be changed suitably. When it is determined at S404 that the data size is greater than the threshold data size (S404: YES), the CPU 111 may carry out an FEC encoding process (S405). At S405, the CPU 111 may generate redundancy data for the normally-encoded data created at S402. The CPU 111 then may carry out a process to create FEC-encoded data.

Subsequently, the CPU 111 may set the FEC-encoded data created at S405 as transmission data (S406). The CPU 111 may add an FEC header to the FEC encoded data processed in steps S405 and S406, and the data may be packetized (S407). The FEC header according to certain embodiments is described below. Following the process of S407, the CPU 111 may carry out a transmission process (S408), which also is described below, and may terminate the transmission side main process thereafter.

When it is determined that the data size is less than the threshold value at S404 (S404: NO), the CPU 111 may set the normally-encoded data encoded at S402 as the transmission data (S409). The CPU 111 may add a header for normal encoding to the data set at S409, and the data may be packetized (S410). Detailed description regarding the header information is described below. CPU 111 may carry out a transmission process after the data is packetized at S410 (S411).

Following S411, the CPU 111 may create a copy of the transmission data (e.g., the normally-encoded data) and add a retransmission header to the copy of the transmission data (S412). In particular, the CPU 111 may create a copy of the normally-encoded data that was set as the transmission data at S409. The CPU 111 may add, as header information, a retransmission header to the copy of the encoded data. The retransmission header may comprise information for a retransmission process. The copy of the encoded data with the added retransmission header may be referred to as "retransmission-encoded data." The CPU 111 may store the retransmission-encoded data, which was created at S412. At S413, the CPU 111 temporarily may store the retransmission-encoded data in the retransmission buffer provided in the RAM 113. Following S413, the CPU 111 may terminate the transmission-side main process.

The transmission process carried out at S408 and at S411 now is described with reference to FIG. 4. First, the CPU 111 may extract the retransmission-encoded data from the retransmission buffer (S501). At S501, the CPU 111 may retrieve the retransmission-encoded data stored in the retransmission buffer during S413 of FIG. 3. The CPU 111 may determine whether the previously-transmitted, encoded data (e.g., the copy of the encoded data previously transmitted to a transmission destination device) exists in the retransmission buffer (S502) by determining whether the retransmission-encoded data retrieved from the retransmission buffer comprises the copy of the encoded data previously transmitted to the transmission destination device. When it is determined at S502 that the previously-transmitted, encoded data exists in the retransmission buffer (S502: YES), the CPU 111 may retransmit the previously-transmitted, encoded data in the retransmission buffer to the transmission destination device (S503). Thereafter, the CPU 111 may transmit the transmission data to the transmission destination device (S504). At S504, the CPU 111 may transmit the FEC-encoded data set as the transmission data at S406 when the FEC-encoded data is set as the transmission data at S406 (S404: YES). Alternatively, at S504, the CPU 111 may transmit the normally-encoded data set as the transmission data at S409 when the normally-encoded data is set as the transmission data at S409 (S404: NO). In addition, when it is determined at S502 that the previously-transmitted, encoded data does not exist in the retransmission buffer (S502: NO), the process may proceed directly to 504, and the CPU 111 may transmit an appropriate one of the normally-encoded data and the FEC-encoded data as the transmission data, based on the determination at S404. Following S504, the CPU 111 may terminate the transmission process.

A reception-side main process now is described with reference to FIG. 5. The reception-side main process may be carried out when the communication device 1 receives transmission data transmitted via a communication line during the transmission side main process, as depicted in FIG. 3. First, the CPU 111 may acquire received data (S601). At S601, the CPU 111 may acquire, as the received data, the transmission data (e.g., one or more of the previously-transmitted, encoded data and the transmission data comprising the FEC-encoded data or the normally-encoded data) transmitted in the transmission process at S408 or at S411 of FIG. 3. Subsequently, the CPU 111 may carry out a header analysis (S602).

Figure 6:
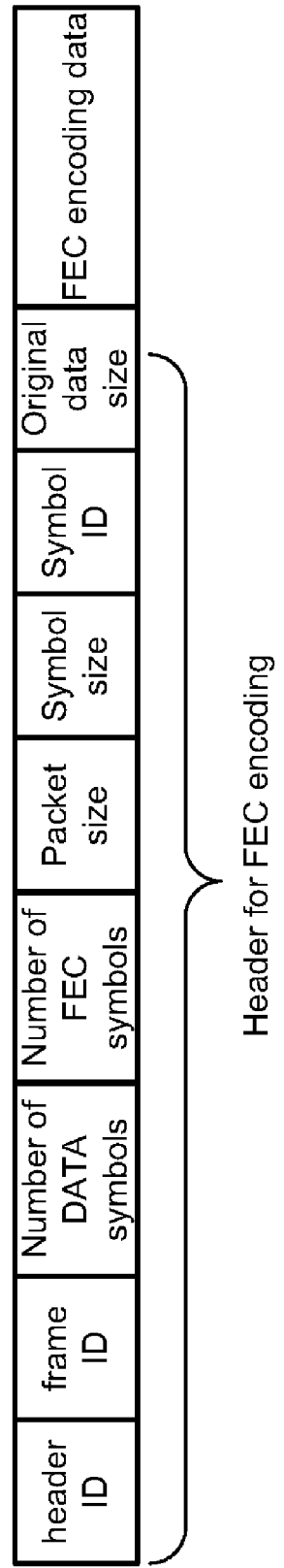
FIG. 6 is a diagram of a data structure of an FEC-encoded data packet.

A data structure of a packet to be transmitted and received now is described with reference to FIGS. 6 to 8. The packet may comprise one or more symbols. As depicted in FIG. 6, a header for FEC encoding (e.g., the FEC header) may comprise information, such as a header ID, a frame ID, a number of DATA symbols, a number of FEC symbols, a packet size, a symbol size, a symbol ID, and an original data size. The header ID may be identification information for a header which indicates that the packet is FEC-encoded data. The frame ID may be identification information that identifies a frame of the encoded data. The number of DATA symbols may represent the number of symbols from a packet that were originally encoded using normal encoding. The number of FEC symbols may be information representing the number of symbols encoded with redundancy data that were added in the FEC process. The packet size may be information representing the data size of the packet. The symbol size may be information representing the data size of a data group comprised by the symbol. The symbol ID may be identification information that identifies the symbol. The original data size may be information representing the data size of the original data. Accordingly, the reception-side communication device 1 may read the header information from the received packet data. Reading the header information may permit the reception-side communication device 1 to carry out decoding under a suitable condition based on the header information. The FEC header added in the process of S407 of FIG. 3 may be added in the form of the data structure of FIG. 6 described above.

Figure 7:
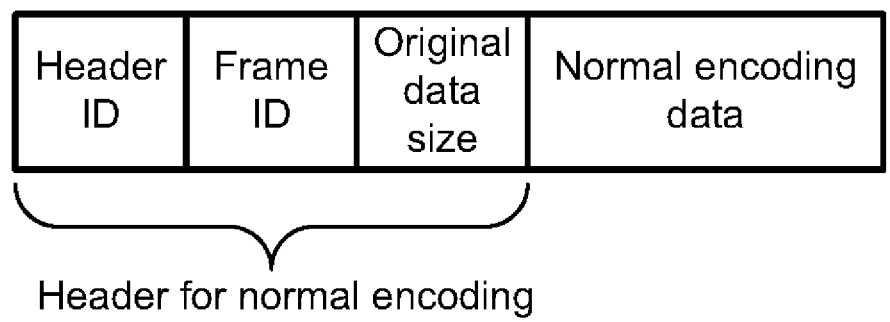
FIG. 7 is a diagram of a data structure of a normally-encoded data packet.

The data structure depicted in FIG. 7 may be a data structure in which the header for normal encoding is added to the normally-encoded data, and in which the data may be packetized. The header for normal encoding may comprise information, such as a header ID, a frame ID, and a data size. The header ID may be identification information for a header which indicates that the packet is the normally-encoded data. The frame ID may be identification information that identifies a frame of the encoded data. The original data size may be information representing the data size of the original data.

Figure 3:
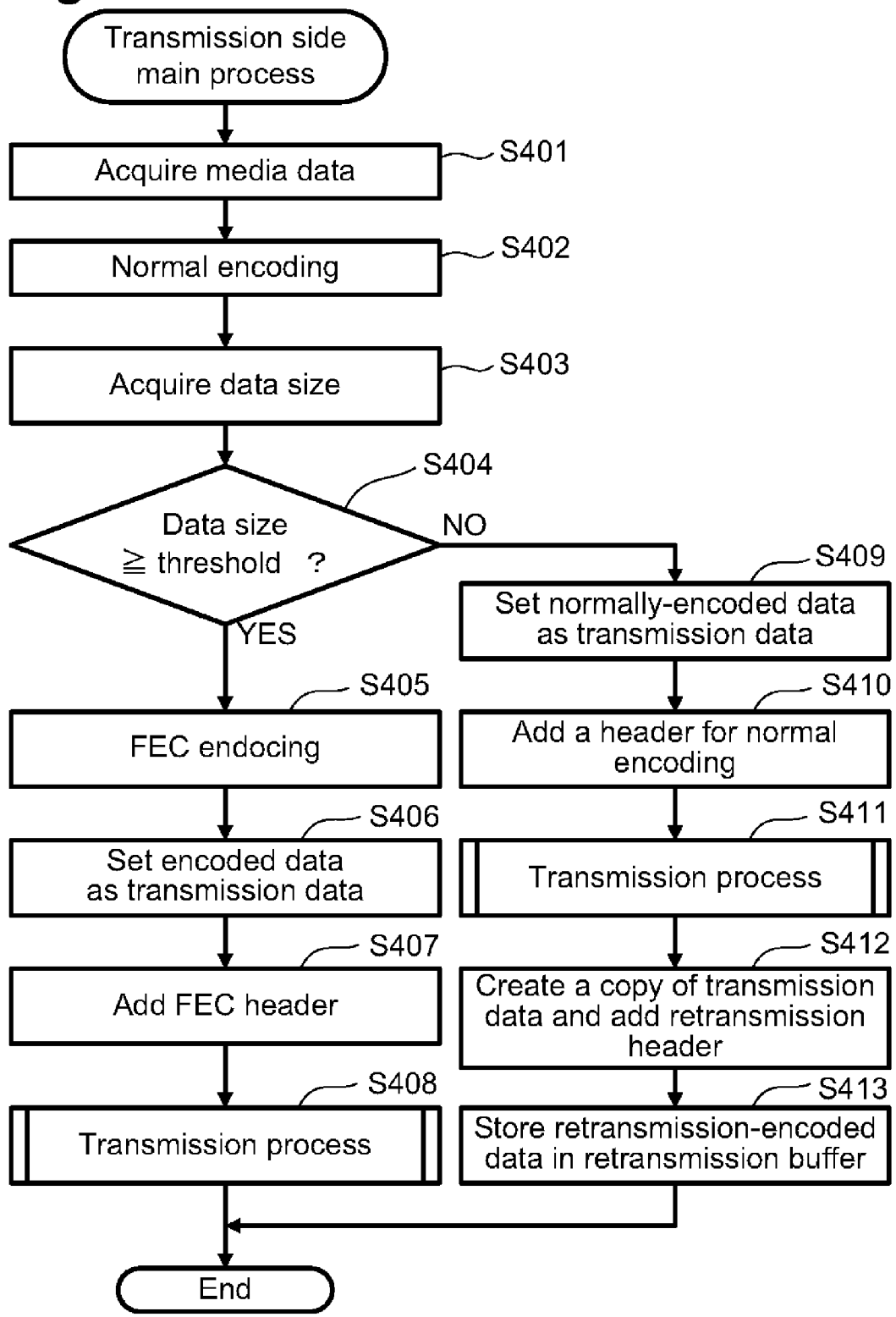
FIG. 3 depicts a transmission-side main process.

The header for normal encoding added in the process of S410 of FIG. 3 may be added in the form of the data structure of FIG. 7 described above.

Figure 8:
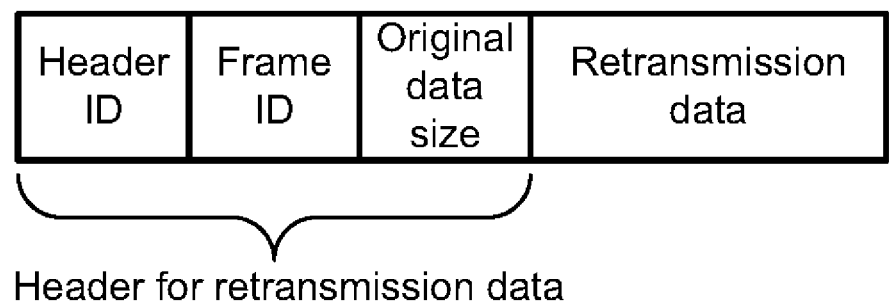
FIG. 8 is a diagram of a data structure of a retransmission data packet.

The data structure depicted in FIG. 8 may be a data structure in which the header for retransmission (e.g., the retransmission header) is added to the copy of the encoded data (e.g., retransmission data), and in which the data may be packetized. The header for retransmission may comprise information, such as a header ID, a frame ID, and the data size. The header ID may be identification information for the header of the packet. The frame ID may be identification information that identifies a frame of the encoded data. The original data size may be information representing the data size of the original data. The header for retransmission and the header described in FIG. 7 may have the same structure but may have different header IDs even when the frame ID and the data size are the same. This may permit the reception-side communication device 1 to recognize the header as the header for retransmission. The header for retransmission added in the process of S412 of FIG. 3 may be added in the form of the data structure of FIG. 8 described above.

Figure 5:
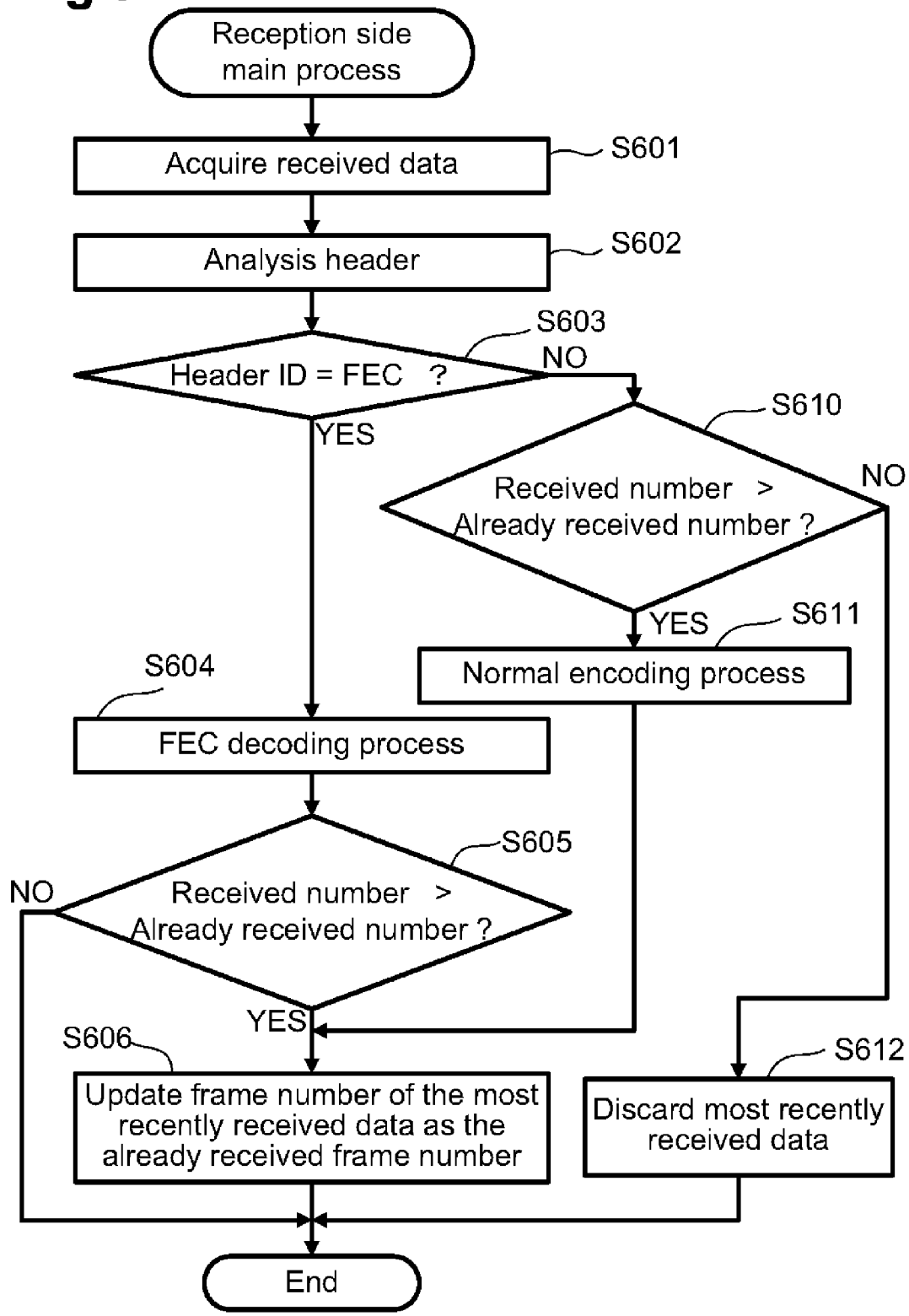
FIG. 5 depicts a reception-side main process.

The description of the reception side main process of FIG. 5 now is continued. Following S602, the CPU 111 may determine whether the header ID indicates that the received data is the FEC-encoded data (S603). When it is determined at S603 that the header ID indicates that the received data is the FEC-encoded data (S603: YES), the CPU 111 may carry out the FEC decoding process (S604). The CPU 111 may determine whether the value of the frame ID (e.g., the frame number) comprised in the header of the received data acquired in steps S601 and S602 is greater than the value of the frame ID associated with the previously-received data (S605). The value of the frame ID comprised in the header of the received data acquired in steps S601 and S602 may be referred to as a received number. The value of the frame ID comprised in the header of the previously-received data may be referred to as an previously-received number.

The frame numbers may be assigned in an ascending order to the frames created in the transmission-side communication device 1. When it is determined at S605 that the frame number of the most recently-received data is greater than the frame number associated with the previously-received data (S605: YES), the CPU 111 may update the previously-received frame number and store the frame number of the most recently-received data as the previously-received frame number (S606). When it is determined at S605 that the frame number of the most recently-received data is less than the frame number associated with the previously-received data (S605: NO), the CPU 111 may terminate the reception side main process.

When it is determined at S603 that the header of the received data is not the header for FEC encoding (S603: NO), the CPU 111 may determine whether the number of the frame ID comprised in the header of the received data acquired in steps S601 and S602 is greater than the frame number associated with the previously-received data (e.g., the data received in the immediately preceding iteration of S601) (S610). When it is determined that the frame ID of the most recently-received data is greater than the frame number associated with the previously-received data (S610: YES), the CPU 111 may carry out the normal decoding process (S611). Based on the frame number of the previously-received data determined at S606, the CPU 111 may perform S611. When it is determined in the process of S610 that the frame number of the most recently-received data is less than or equal to the frame number associated with the previously-received data (S610: NO), the CPU 111 may carry out a process to discard the most recently-received data (S612), and the CPU 111 may terminate the reception-side main process thereafter.

Figure 4:
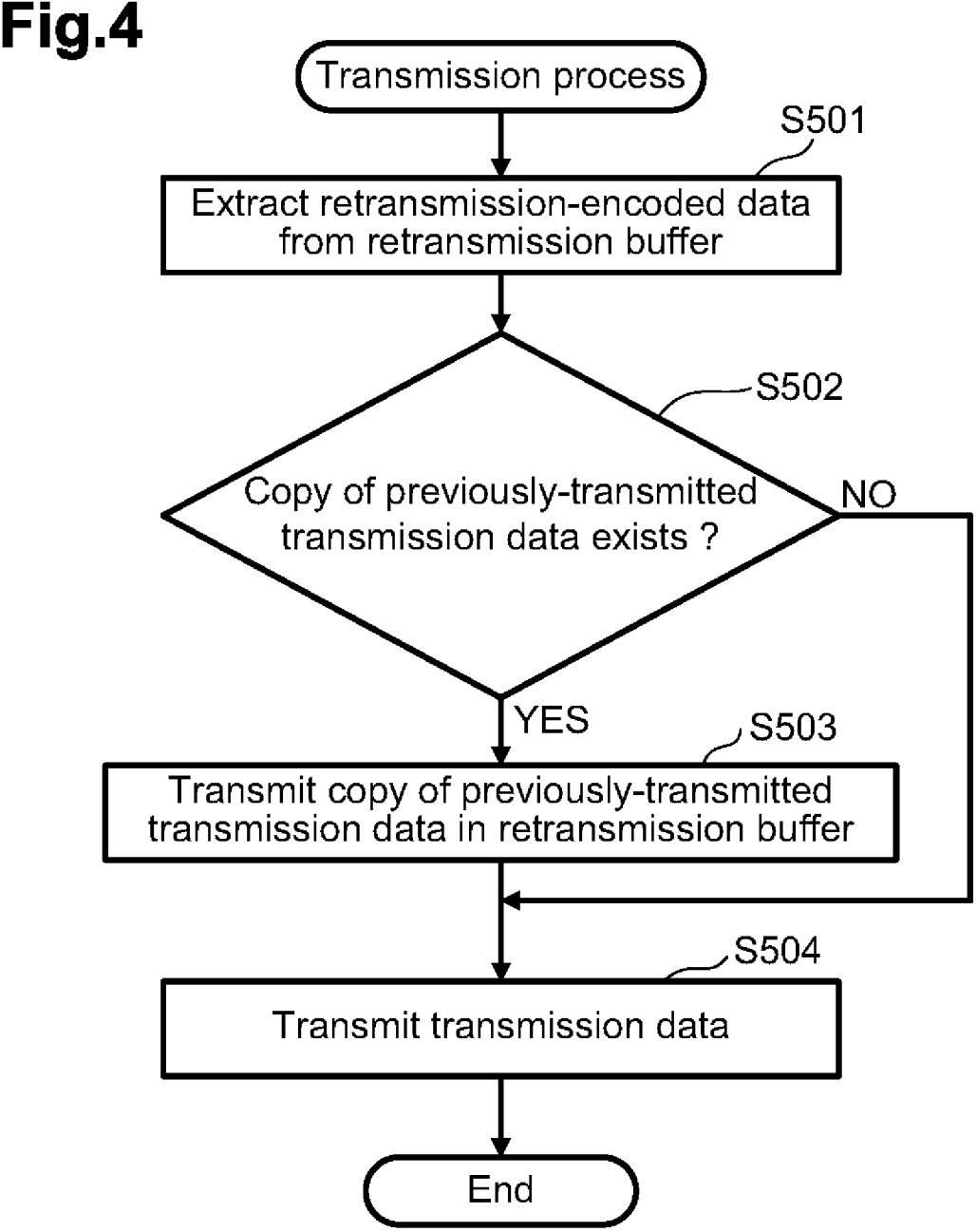
FIG. 4 depicts of a transmission process.
Figure 9:
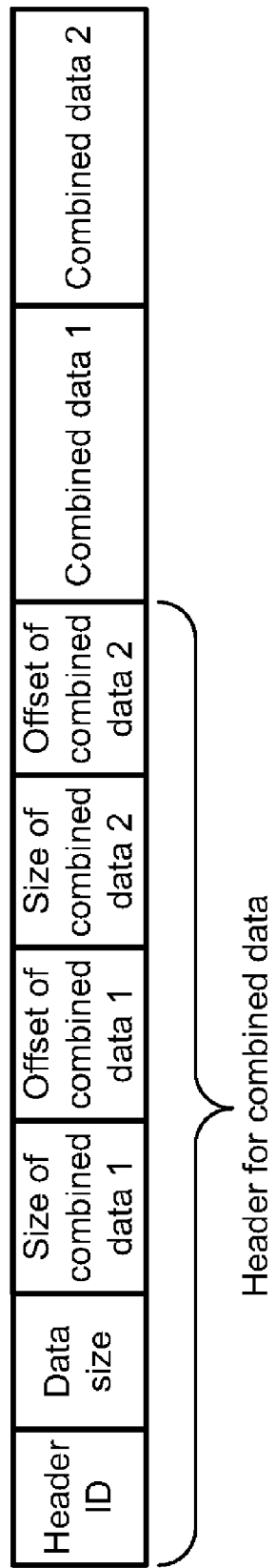
FIG. 9 is a diagram of a data structure of synthesized data packet.
Figure 10:
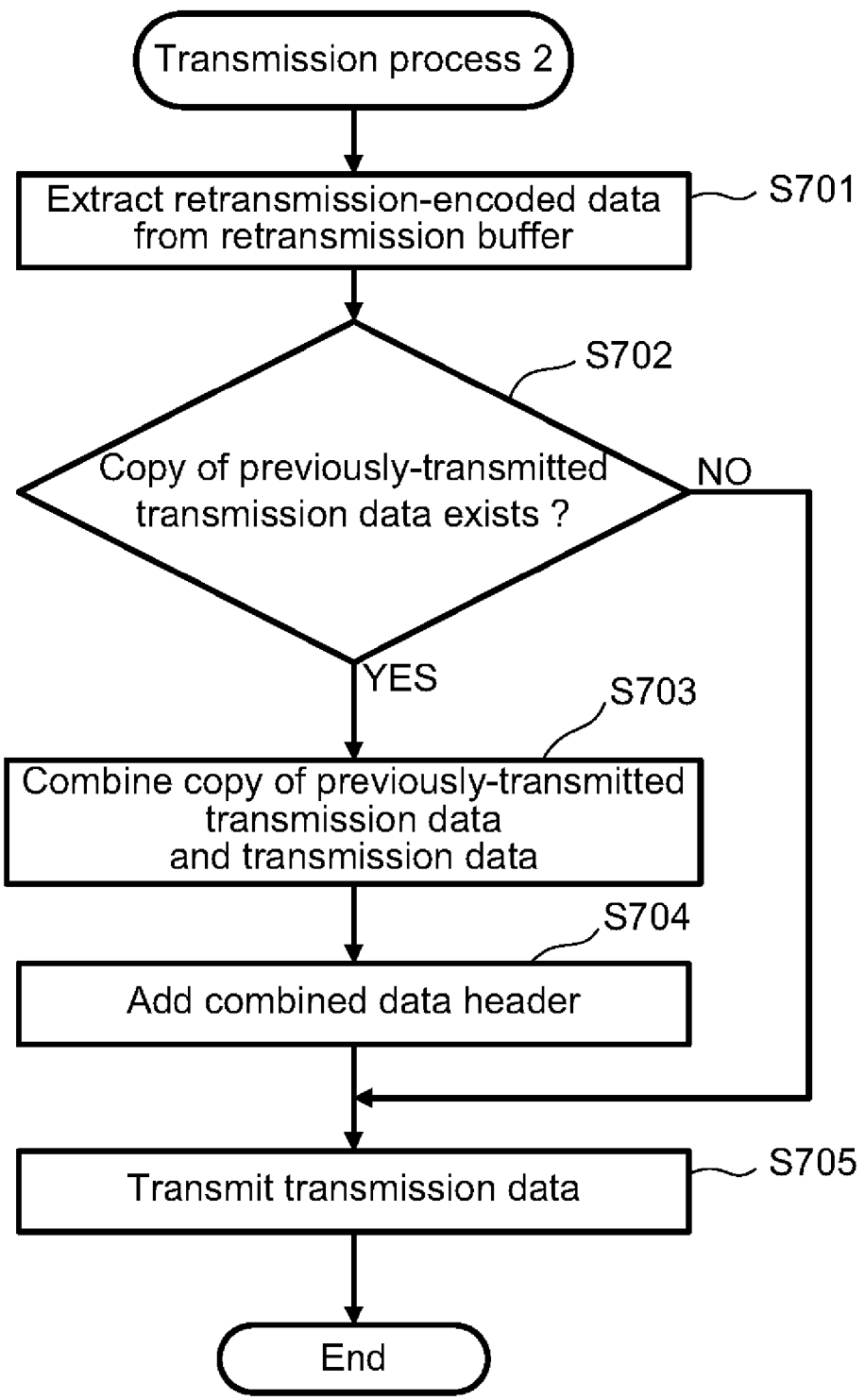
FIG. 10 depicts another transmission process according to other embodiments.

With reference to FIG. 10, a modification of the transmission process of FIG. 4 now is described. FIG. 10 depicts a transmission process 2. In the transmission process 2, the copy of the previously-transmitted transmission data and the currently-set transmission data may be combined and transmitted as a single packet. Differences between the transmission processes of FIG. 4 and the transmission process 2 of FIG. 10 now are described. Processes of S701 and S702 may be the same as those of steps S501 and S502 in the transmission process of FIG. 4, and a description thereof is omitted. When it is determined in the process of S702 that the previously-transmitted, encoded data (e.g., the copy of the encoded data previously transmitted to a transmission destination device) exists in the retransmission buffer (S702: YES), the CPU 111 may carry out a process to combine the copy of the previously-transmitted transmission data and the currently-set transmission data (S703). The CPU 111 may add a combined data header and packetize the data (S704). A data structure of the data packetized at S704 is described with reference to FIG. 9.

As depicted in FIG. 9, the combined data header may comprise a header ID, the data size, a size of combined data 1, an offset of the combined data 1, a size of combined data 2, and an offset of the combined data 2. The header ID may be identification information for a header which represents that the packet is the combined data. The data size may be information representing the data size of the packet. The size of combined data 1 may be information representing the data size of the combined data 1. The offset of the combined data 1 may be information representing the position of the combined data 1 in that packet. The size of combined data 2 may be information representing the data size of the combined data 2. The offset of combined data 2 may be information representing the position of the combined data 2 in that packet.

Description of the transmission process 2 of FIG. 10 now is continued. Following the process of S704, the CPU 111 may transmit the combined data packetized at S704 (S705), and the CPU 111 may terminate the transmission process 2 thereafter. Because the copy of the previously-transmitted transmission data and the currently-set transmission data may be combined into a single packet, the data may be transmitted efficiently.

With reference to FIG. 11, another modification of the transmission process of FIG. 4 now is described. FIG. 11 depicts a transmission process 3. In the transmission process 3, similarity between the copy of the previously-transmitted transmission data and the currently-set transmission data may be analyzed and, when similarity is great, such as, for example, an 80% similarity, the copy of the previously-transmitted transmission data may not be transmitted. Differences between the transmission process of FIG. 4 and the transmission process 3 of FIG. 11 now are described. Processes of S801 and S802 may be the same as those of S501 and S502 in the transmission process of FIG. 4, and a description thereof is omitted. When it is determined at S802 that the previously-transmitted, encoded data (e.g., the copy of the encoded data previously transmitted to a transmission destination device) exists in the retransmission buffer (S802: YES), a CPU 111 may carry out a similarity determination process (S803). The similarity determination at S803 may proceed in accordance with the similarity determination method executed while executing the similarity determining function 308 depicted in FIG. 2.

Following S803, the CPU 111 may determine whether the similarity determined at S803 is equal to or greater than a threshold similarity, such as, for example, a threshold of 80% similarity or greater (S804). When it is determined at S804 that the similarity is equal to or greater than the threshold value (S804: YES), the CPU 111 may delete the copy of the previously-transmitted transmission data in the retransmission buffer (S807). The CPU 111 may proceed to S806 and transmit the encoded data set as the transmission data (S806) and may terminate the transmission process 3 thereafter. When it is determined at S804 that the similarity is less than the threshold value (S804: NO), the CPU 111 may carry out processes of steps S805 and S806. The CPU 111 may terminate the transmission process 3 thereafter. The processes of steps S805 and S806 are the same as those of steps S503 and S504 in the transmission process of FIG. 4, and description thereof is omitted. In certain configurations of the communication device 1, when the similarity between the copy of the previously-transmitted transmission data and the currently-set transmission data is great (e.g., greater than the threshold similarity), the process of transmitting the transmission data at S806 may not be carried out. Therefore, the transmission process 3 according to FIG. 11 may reduce unnecessary data transmission.

According to embodiments described above, when the data size of the multimedia data is less than the threshold data size, the communication device 1 may not carry out an unnecessary FEC process to create a redundant packet. Therefore, inefficient use of a communication band of a communication path may be reduced. Even when multimedia data of small data size does not undergo the FEC process, the communication device 1 may divide the same data into multiple packets and retransmit the packets. Therefore, even when packet loss occurs during the transmission, the multimedia data may be reproduced properly in the reception-side device. The communication device 1 may efficiently packetize and may transmit the multimedia data without an unnecessary increase in the number of packets. The communication device 1 may not unnecessarily retransmit data when the similarity between consecutive multimedia data is great (e.g., when there is little change in the content of the data). In the communication device 1, the threshold data size may be set to half of the maximum transmittable data size permitted by the communication device 1, the communication band, or the communication path. In such a configuration, even when the same multimedia data is retransmitted, the communication device 1 may make the data size of the transmitted data less than the data size of the FEC-encoded data that exceeds the maximum value, such that the FEC-encoded data may be created as plural packets.

The disclosure herein may not be limited to embodiments described above, and various modifications may be made. For example, although the header structure of the data packet in has been described in FIGS. 6 to 9, the header structure may not be limited thereto. Besides the information comprised in the header described above, header information usually used in data transmission may be comprised. For example, an IP address of a transmission source device, an IP address of a transmission destination device, and transmission date information may be comprised in the header.

While the invention has been described in connection with various exemplary structures and illustrative embodiments, it will be understood by those skilled in the art that other variations and modifications of the structures, configurations, and embodiments described above may be made without departing from the scope of the invention. For example, this application comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A communication device comprising:
   a processor; and
   a memory configured to store computer-readable instructions therein,
   wherein the computer-readable instructions instruct the processor to execute processes comprising:
   acquiring media data comprising one or more of image data and audio data from an acquiring device;
   encoding the acquired media data to generate particular encoded data;
   determining whether a data size of the particular encoded data is equal to or greater than a threshold data size;
   encoding the particular encoded data using redundancy processing to generate redundantly-encoded data when determining that the data size of the particular encoded data is equal to or greater than the threshold data size; and
   transmitting the redundantly-encoded data as one or more packets to another communication device.

2. The communication device according to claim 1, wherein the particular encoded data comprises normally-encoded data that is encoded using a normal encoding process, and
   wherein the normal encoding process is different from the redundancy processing.

3. The communication device according to claim 2, wherein the redundantly-encoded data comprises Forward Error Correction ("FEC")-encoded, and
   wherein the redundancy processing comprises FEC processing.

4. The communication device according to claim 1, wherein the computer-readable instructions further instruct the processor to execute processes comprising:
   transmitting the particular encoded data as a packet to the other communication device when the processor determines that the data size of the encoded data is less than the threshold data size.

5. The communication device according to claim 4, wherein the computer-readable instructions further instruct the processor to execute processes comprising:
   storing the particular encoded data in the memory when the processor transmits the encoded data as the one or more packets;
   acquiring additional media data from the acquiring device after the processor transmits the particular encoded data as the one or more packets;
   encoding the acquired additional media data to generate additional encoded data;
   determining whether a data size of the additional encoded data is equal to or greater than the threshold data size; and
   transmitting the previously-transmitted, encoded data stored in the memory and the additional encoded data to the other communication device when the processor determines that the data size of the additional encoded data is less than the threshold data size.

6. The communication device according to claim 4, wherein the computer-readable instructions further instruct the processor to execute processes comprising:
storing the particular encoded data in the memory when transmitting the particular encoded data as the one or more packets;
acquiring additional media data from the acquiring device after transmitting the particular encoded data as the one or more packets;
encoding the acquired additional media data to generate additional encoded data;
determining whether a data size of the additional encoded data is equal to or greater than the threshold data size;
determining whether the additional encoded data and the previously-transmitted, encoded data are similar using a similarity determination process,
wherein the similarity determination process comprises determining whether a similarity value indicating a similarity between the additional encoded data and the previously-transmitted, encoded data is greater than a predetermined threshold similarity;
transmitting the previously-transmitted, encoded data stored in the memory to the other communication device when the processor determines that the similarity value is less than or equal to the predetermined threshold similarity; and
transmitting the additional encoded data to the other communication device when the processor determines that the data size of the additional encoded data is less than the threshold data size.

7. The communication device according to claim 1,
wherein the communication device is configured to transmit a data packet having a data size equal to or less than a maximum data size to the other communication device, and
wherein the threshold data size is equal to or less than half of the maximum data size.

8. A method comprising:
acquiring media data comprising one or more of image data and audio data from an acquiring device;
generating particular encoded data from the acquired media data;
determining whether a data size of the particular encoded data is equal to or greater than a threshold data size;
generating redundantly-encoded data from the particular encoded data using redundancy processing when it is determined that the data size of the particular encoded data is equal to or greater than the threshold data size; and
transmitting the redundantly-encoded data as a packet to another communication device.

9. A non-transitory, computer-readable storage medium storing computer readable instructions that, when executed, instruct a communication device to execute processes comprising:
acquiring media data comprising one or more of image data and audio data from an acquiring device;
encoding the acquired media data to generate particular encoded data;
determining whether a data size of the particular encoded data is equal to or greater than a threshold data size;
encoding the particular encoded data using redundancy processing to generate redundantly-encoded data when determining that the data size of the particular encoded data is equal to or greater than the threshold data size; and
transmitting the redundantly-encoded data as a packet to another communication device.

10. The communication device according to claim 6, wherein the similarity determination process comprises one or more of:
determining whether a similarity value indicating a similarity between an audio waveform extracted from the previously-transmitted, encoded data and an audio waveform extracted from additional encoded data is equal to or greater than the predetermined threshold similarity; and
determining whether a similarity value indicating a similarity between an outline shape extracted from the previously-transmitted, encoded data and an outline shape extracted from additional encoded data is equal to or greater than the predetermined threshold similarity.

* * * * *